United States Patent [19]

Loyer et al.

[11] 4,420,285
[45] Dec. 13, 1983

[54] APPARATUS FOR LOADING BULK MATERIALS FROM A STORAGE BIN INTO A TRUCK

[75] Inventors: Georges Loyer, Viviers; Jean Bonnet, Carry-le-Rouet; Roger Lazzarini, Marseille, all of France

[73] Assignee: LaFarge Conseils et Etudes, Paris, France

[21] Appl. No.: 336,303

[22] Filed: Dec. 31, 1981

[30] Foreign Application Priority Data

Jan. 5, 1981 [FR] France ............................... 81 00056

[51] Int. Cl.³ .............................................. B65G 67/06
[52] U.S. Cl. ....................................... 414/291; 141/93; 141/285; 141/312; 414/328
[58] Field of Search ............... 414/141, 291, 292, 328, 414/373; 141/93, 285, 312, 368

[56] References Cited

U.S. PATENT DOCUMENTS

| | | | |
|---|---|---|---|
| 1,667,896 | 5/1928 | Maguire | 141/93 X |
| 1,797,558 | 3/1931 | Stone et al. | 414/328 |
| 2,105,589 | 1/1938 | Eades | 141/285 X |
| 2,255,448 | 9/1941 | Morris | 414/291 |
| 2,763,419 | 9/1956 | Brown et al. | 141/312 X |
| 3,707,998 | 1/1973 | Dalrymple | 414/291 X |

*Primary Examiner*—Leslie J. Paperner
*Attorney, Agent, or Firm*—Frost & Jacobs

[57] ABSTRACT

Apparatus for loading bulk materials from a storage bin into a truck body. An enclosure is defined by flexible rubber movable walls of which at least three are horizontally displaceable into contact with the corresponding sides or edges of the body of the truck to be loaded. Exhaust fans cause a negative pressure inside the enclosure sufficient to urge the movable walls into sealing contact at the corners of the enclosure and against the sides or edges of the truck body. At the end of loading, detectors automatically cause the horizontally displaceable walls to move back out of contact with the truck body to facilitate ingress and egress of the truck.

4 Claims, 2 Drawing Figures

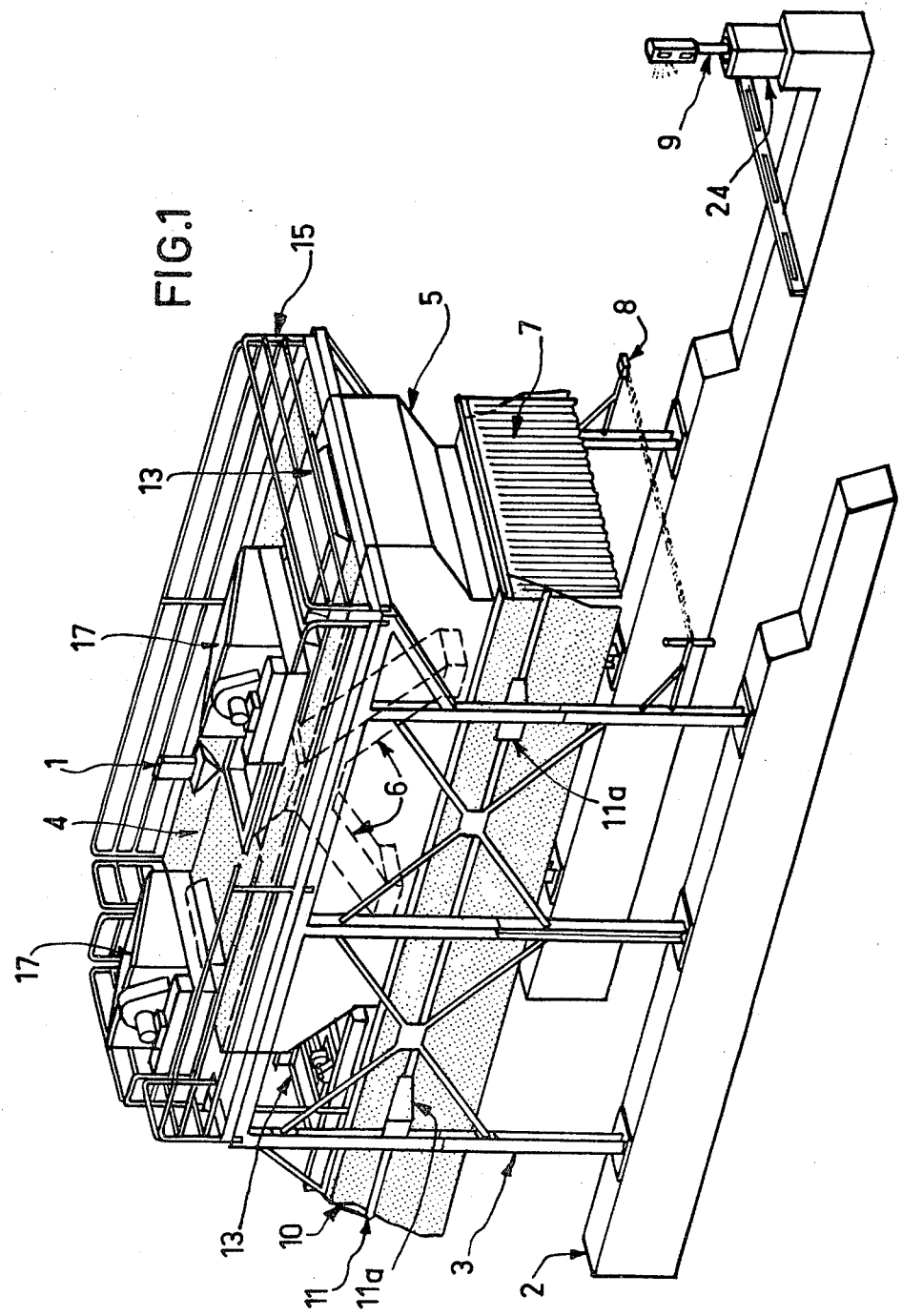

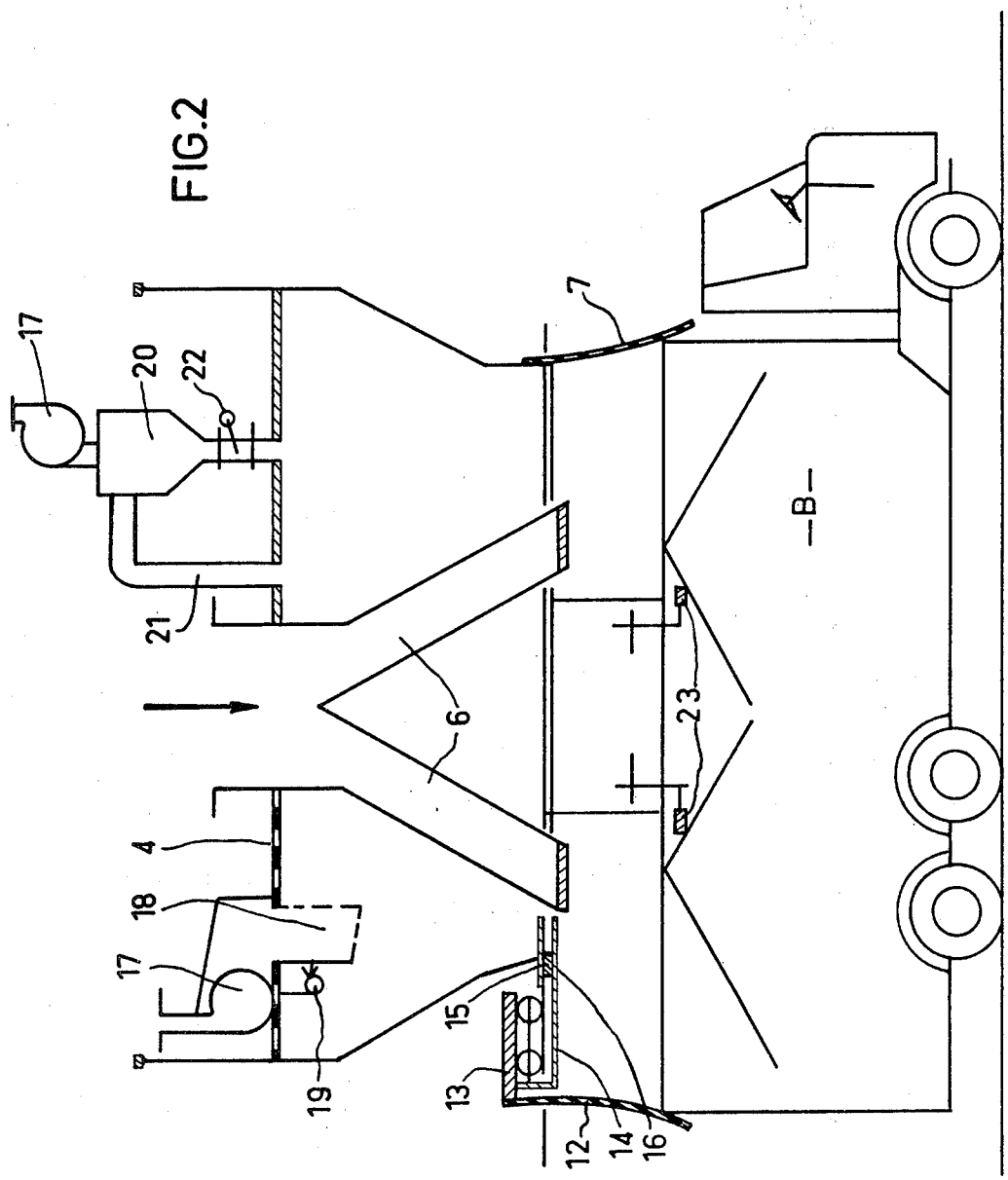

APPARATUS FOR LOADING BULK MATERIALS FROM A STORAGE BIN INTO A TRUCK

FIELD OF THE INVENTION

The present invention relates to apparatus for loading bulk materials into trucks from a storage unit such as a hopper, bin or silo.

Loading trucks from storage bins entirely with bulk materials in finer or coarser particulate form containing a proportion of pulverulent substance, inevitably results in dust particles being suspended in the air which contaminates the surroundings.

PRIOR ART

In some cases this difficulty may be reduced by moistening the dust but this technique is not always applicable and if the moisture must be eliminated afterwards, the attendant energy consumption may be prohibitive.

It is common practice to place an open container below the discharge opening of the storage bin containing dry substances, and limit the amount of dust given off by canapies or movable partitions arranged around the container, or by a flexible sleeve which bears against the edges of the container opening. The container loading operation is then carried out in a sealed enclosure. After the dust raised has settled in the container, the canopy movable partitions or sleeve is lifted out of the way and the container is removed. This process is time-consuming and the suspended dust is not entirely eliminated because the finest dust particles remain in suspension for a considerable period of time. Further, some dust also clings to the walls of the enclosure, settling only after the container has been removed.

There are, of course, more complicated solutions for radioactive or highly toxic materials, i.e., cases where safety is the prime consideration, over productivity and production cost.

The operating principle of many of the foregoing solutions is the use of a container which is separate from the truck whereby there are two successive steps: filling the container then loading it on the bed or platform of the truck trailer or truck. Indeed, the configuration of a straight truck or dump truck is poorly adapted to the provision of an sealed enclosure. A complicated mechanism is required for providing a fluidtight enclosure whose walls are suitably joined to the sides of the body of the truck while being easily detachable so as not to interfere with the displacements of the truck nor to risk any damage in the course thereof.

Systems have also been proposed wherein there is provided around a straight truck or dump truck, a nonfluid-tight enclosure by means of fixed and/or movable walls and/or a movable ceiling so as to form a hood surrounding the discharge chute. The dust given off to the exterior is then eliminated or reduced by exhausting the dust-laden air to a recovery station. Such arrangements require extremely powerful exhaust fans and in addition the actual flow of exhausted air increases the amount of dust in suspension.

OBJECT AND SUMMARY OF THE INVENTION

An object of the present invention is to provide an apparatus for loading bulk materials into trucks in which truck is loaded directly, with considerably reduced air contamination and pollution and low energy consumption.

According to the invention there is provided apparatus for loading bulk materials into the body of a truck from a storage bin. The truck is loaded in a sealed enclosure having movable wall members. The apparatus comprises a fluidtight ceiling supporting a hood the lower part of which is higher than the maximum height of trucks to be loaded. The width and length of the hood are at least equal to that of the truck bodies. The hood contains a chute for discharging bulk materials into the truck bodies and is connected to means for exhausting air under the hood. The walls of the hood are extended downwardly by flexible movable walls cooperable with the sides of a truck body. At least three of the movable walls are displaceable horizontally toward the lateral and transverse sides of edges of the truck body. And the air exhausting means is powerful enough to urge the movable walls into substantially fluidtight contact at the corners of enclosure and against the sides or edges of the truck body.

Preferably, a first transverse movable wall is suspended from a point fixed relative to the apparatus, the truck being displaced to bring a side or edge of the truck body into contact therewith. Means are provided for urging the lateral walls to come into contact with the lateral sides or edges of the truck body and with the first transverse movable wall. Other means permit a second transverse wall to be urged sliding in frictional engagement with the two lateral movable walls until it comes into contact with the corresponding edge or side of the truck body.

According to interesting features, means are provided to intercept dust entrained toward the means for exhausting air and return it to the truck body. One or more detector means are responsive to the loading of the truck are provided, capable of delivering signals for automatically controlling the disengagement of the movable walls and stopping the apparatus.

The invention will now be described in greater detail by reference to a nonlimiting embodiment illustrated in the drawings.

BRIEF DESCRIPTION OF THE DRAWINGS

FIG. 1 is an overall perspective view of the entire apparatus for loading bulk materials into a truck; and FIG. 2 is a schematic longitudinal sectional view of the apparatus, with a truck, at the end of the loading operation.

DETAILED DESCRIPTION OF THE PREFERRED EMBODIMENT

The apparatus illustrated in the drawings is intended for loading clinker at a high rate, e.g. 300 metric tons, per hour, of 25 metric tons, into trucks having a load capacity the complete loading operation therefore taking only about 5 minutes. The means for feeding the bulk material are not illustrated but are symbolized by a vertical arrow 1. The bulk materials may be conveyed from a storage bin or silo provided with valve controls at its lower end or a belt conveyor system.

Truck traffic is from left to right in FIG. 1, between the masonry side walls 2 which also define guides and support the superstructure 3 of the apparatus.

The superstructure 3 supports a fluidtight sheet metal ceiling 4 which supports a sheet metal hood 5 the lower part of which is higher than the maximum height of the trucks to be loaded. Inside the hood 5 are two inclined chutes 6 which discharge clinker simultaneously into the front and back of the body B of the truck. It will be noted that the loading of trucks is effected without moving the truck contrary to common practice wherein the front of the body is loaded by a single chute and then the truck is moved forward a short distance to load the back of the body.

The hood 5 comprises the fixed part of the loading enclosure. Its sides are extended downwardly by four movable walls.

A forward movable wall 7 comprises a partition of flat vertical flexible rubber strips, fixed at their upper ends to the hood 5. When the truck pulls up to be loaded, it stops so that the lower end of its forward movable wall 7 bears against the front side or edge of the body B of the truck. The strips are tapered to permit overlapping thereby improving fluidtightness.

A photocell 8 controls the traffic signal 9 and enables the driver to stop the truck at the precise moment the front edge or side of the truck body B comes into contact with the forward movable wall 7.

Two lateral movable walls 10 (only one of which is shown) are fixed at their upper ends to the lower edge of the hood 5. Each of the lateral movable walls 10 comprises a continuous sheet of flexible rubber and it comprises a horizontal support bar 11 placed a third the way down its height. The support bar 11 is connected to jacks 11a fixed to the superstructure 3 and operating in a horizontal direction. When the jacks 11a are retracted the lower part of the lateral movable walls 10 are in vertical alignment with the side walls 2 and therefore incapable of being grabbed by a truck coming in or going out. When the jacks 11a are extended, the lateral movable walls 10 are in contact at their lower ends with the sides or edges of the truck body B, the forward end of the lateral movable walls with the forward movable wall 7 and the rear end with the rear movable wall 12 which will presently be referred to. The rear movable wall 12 comprises a vertical rubber panel, shown in FIG. 2, suspended from a carriage 13 mounted to roll from front to back on a track fixed to the superstructure 3. Whereas the positions of the lateral walls 10 are subjected to relatively small variations owing to the substantially constant width of truck bodies guided between the side walls 2 to a substantially centered position, such is not the case for the length of truck bodies. And since the position of the front edge or side of the truck body B is determined by that of the forward movable wall 7, it is necessary to provide considerable variations of the position of the rear movable wall 12. The width of the rear movable wall 12 is greater than that of the truck body B and its securement to the carriage 13 is at the middle of the upper edge of the rear movable wall 12. Since the ends of the rear movable wall 12 are flexible they may deform when the lateral movable walls 10 come into contact therewith, thus providing a fluidtight position.

A shiftable horizontal metal sheet 14 fixed to the rear movable wall 12 is displaceable with the carriage. The horizontal metal sheet is in contact with another shiftable horizontal sheet 15 fixed to the hood by means of a rubber seal or gasket 16, thereby completing the fluidtightness of the enclosure.

Two exhaust fans 17 are mounted on the ceiling 4 and exhaust air from the hood through a dust filter sleeve 18 equipped with means for shaking off dust schematically illustrated at 19.

To the right in FIG. 2 is shown a modified arrangement which comprises a cyclone separator 20 disposed between the exhaust fan 17 and an exhaust air duct 21 which extends through the ceiling 4. At the lower end of the cyclone separator 20 is a valve 22 for carrying away recovered dust back to the truck body B. This arrangement which is more expensive that the preceding one is more efficient because it avoids accidental dropping of dust from the filter sleeve 18 until after the departure of the truck.

Since the enclosure is entirely sealed it poses the problem of controlling the end of the loading operation. This may be carried out by providing an inspection hole in the hood 5. But given the height above the ground level such an arrangement would be hardly practical. Alternatively, the forward movable wall 7 may be made of transparent material, but such a material is not suitable when handling abrasive materials. It is also possible to determine the weight of the load by means of sensing means comprising strain gauges in the storage bin or by means of an integrating bridge of a strain gauge for a band conveyor. Or, more simply, a platform weighing machine under the apparatus. The approximate weight controls the stopping of loading and the retracting of the lateral and rear movable walls. The exact weight is then determined after elimination of the error factor due to the thrust exerted by the movable walls against the truck body.

Another solution consists in providing proximate to the chutes 6 rotary vane detector means 23 of the type comprising blades rotatable about a vertical axis which is stopped when the loaded material is at the desired level. The detector means 23 are of course raised out of the truck body so as not to interfere with movements of the truck. They have the advantage of providing direct level control. In addition, in case of an anomaly detected at one of the chutes, they may provide an alarm signal thereby enabling the balancing of the load with a distributor valve disposed at the inlet end of the chutes.

The detector means 23 control the lifting of the gate 24 at the end of the loading operation.

The operation of the apparatus will be easily understood from the foregoing description: an empty truck pulls up between the side walls 2 and advances slowly until the traffic signal 9 controlled by the photocell 8 gives the signal to the driver that the forward movable wall 7 has come into contact with the front side or edge of the truck body B. The driver, or some other operator, then controls the subsequent steps. The jacks 11a urge the bar 11 inwardly until the lateral movable walls 10 come into bearing contact with the sides of the truck body B and forwardly until the lateral movable walls 10 likewise are in engagement with the forward movable wall 7.

Thereafter the carriage 13 moves forwardly and with it the rear movable wall 12 between the lateral movable walls 10 with which it comes into substantially fluidtight contact until the rear movable wall 12 also comes to bear against the back of the truck body B. At that moment the sealed enclosure is defined, the exhaust fans 17 are started up which tightens contact between the movable walls and between the movable walls and the sides of the truck body B thereby producing what may be termed self-sealing. The bulk material feed means 1 are actuated and the level detector means 23 brought to the desired level. Near the end of loading, the level detector means 23 control the end of loading operation sequence: stopping the feed means 1, stopping the air exhaust means, shaking the sleeves 18 should appropriate means be provided, and after a predetermined delay period retracting the carriage 13 rearwardly and the jacks 11a outwardly, raising the detector means 23, and lifting the gate 24 thereby permitting the departure of the loaded truck and another truck to take its place.

What we claim is:

1. Apparatus for loading bulk materials from a storage unit into the body of a truck, said apparatus comprising a fluidtight ceiling supporting a hood, the lower part of said hood being heigher than the maximum higher of trucks to be loaded, the width and length of said hood being at least that of bodies of trucks to be loaded, said hood accommodating a chute for discharging bulk materials into the truck body to be loaded, means connected to said hood for exhausting air from under said roof, flexible movable wall means downwardly extending from walls of said hood and cooperable with sides or edges of the truck body to be loaded, said flexible movable wall means defining an enclosure, at least three said movable walls means being horizontally displaceable toward corresponding lateral and transverse sides of the truck body to be loaded, said means for exhausting air being powerful enough to urge said movable wall means into substantially fluidtight contact at corners of said enclosure against sides or edges of the truck body to be loaded.

2. The apparatus of claim 1, wherein a first said movable wall means being disposed transversely and suspended along a fixed line relative to said apparatus, said first movable wall means cooperable with a corresponding transverse side or edge of the truck body by displacing the truck to be loaded, second and third said movable wall means being disposed laterally, means for bringing said second and third movable wall means into contact with lateral sides or edges of the truck to be loaded, and a fourth said movable wall means being disposed transversely, means for sliding said fourth movable wall means in frictional engagement with said second and third movable wall means until said fourth movable wall means comes into contact with a corresponding transverse side or edge of the body of the truck to be loaded.

3. The apparatus of claim 1 or 2, including means for intercepting dust entrained toward said means for exhausting air, further comprising means for carrying intercepted dust to the truck body to be loaded.

4. The apparatus of claim 1 or 2, further comprising at least one detector means responsive to the end of loading the truck, said detector means providing signals for automatically stopping feeding of bulk materials from the storage unit and the operation of said means for exhausting air, and for automatically retracting said means for bringing said second and third movable wall means into contact with lateral sides or edges of the truck body and said means for sliding said fourth movable wall means.

* * * * *